Aug. 24, 1965    G. SAVASTANO    3,202,916
D.C. WATT-HOUR METERING DEVICE INCLUDING A SATURABLE
REACTOR MEANS AND A MULTIVIBRATOR
Filed March 4, 1964    2 Sheets-Sheet 1

INVENTOR
Giorgio Savastano
BY Wenderoth, Lind & Ponack
ATTORNEYS

United States Patent Office 3,202,916
Patented Aug. 24, 1965

3,202,916
D.C. WATT-HOUR METERING DEVICE INCLUDING A SATURABLE REACTOR MEANS AND A MULTIVIBRATOR
Giorgio Savastano, Via Belvedere 20, Naples, Italy
Filed Mar. 4, 1964, Ser. No. 349,411
Claims priority, application Italy, Feb. 13, 1959,
2,142/59
4 Claims. (Cl. 324—142)

This application is a continuation-in-part of my application Serial No. 8,094, filed Feb. 11, 1960; now abandoned entitled Power Metering Device for Direct Current Distribution Network.

The present invention relates to a self-powered watt-hour metering device for direct current networks including a saturable reactor working as a D.C. transformer.

Direct current watt-hour meters are known in which a single phase watt-hour meter is used as indicating instrument and the proportionality of the A.C. current of the current coil to the D.C. current is obtained by means of a complicated servo-system consisting of a galvanometer, a photocell, a servomotor and a mechanically variable voltage supply. In these systems, between the D.C. line and the single phase watt-hour meter there is not provided any insulating device, thus at the high voltage of the D.C. line the indicating instrument may easily reach dangerous high potentials. It is an object of this invention to remove this disadvantage.

There are known also other systems which require an auxiliary voltage. An object of the present invention is to provide a D.C. watt-hour meter insulated with respect to the D.C. power system, which does not require any D.C. or A.C. auxiliary supply and has an error range equal to those of the conventional D.C. watt-hour meters.

Another object of this invention is to provide a rugged and low cost D.C. watt-hour meter without any electromechanical parts such as galvanometer, photocell, servomotor, mechanically variable voltage supply, etc.

A further object of the present invention is to provide a pure electric system for attaining an extended proportionality range of the D.C. current to the A.C. current without any remarkable delay to be added to that of the indicating instrument.

The general object of the present invention is to provide a D.C. watt-hour metering device having all the advantages above referred to and consisting of a magnetically coupled multivibrator supplied from the D.C. line and generating square wave voltages proportional to the voltage of the D.C. line, said multivibrator consisting of at least two transistors and a transformer having a primary winding, a first, a second and a third secondary winding, the ends of the primary winding being connected with the bases of said transistors, a central tap of said primary winding being connected with the middle point of a resistive voltage divider used for biasing bases of said transistors, an induction watt-hour meter having a current coil and a voltage coil, a saturable reactor means controlled by the D.C. current and having two cores with control windings connected in series and output windings connected in series and oppositely wound to cause said reactor to work as a D.C. transformer, said reactor being connected between said second secondary winding of said transformer and voltage coil of said watt-hour meter and a resistor connected between said third secondary winding of said transformer and current coil of said watt-hour meter.

Another object of this invention is to provide a D.C. watt-hour metering device based on the same principle, except that in this case the saturable reactor is connected between the second secondary winding of the transformer and the current coil of the induction watt-hour meter, whereas the resistor is connected between the third secondary winding of the transformer and the voltage coil of said watt-hour meter.

A still further object of this invention is to adapt the D.C. watt-hour metering device for energy measurement in high voltage D.C. networks by adding a voltage divider for supplying the multivibrator.

These and other objects of the present invention will appear from the following specification of some embodiments thereof, taken in connection with the accompanying drawings in which.

Figure 1:
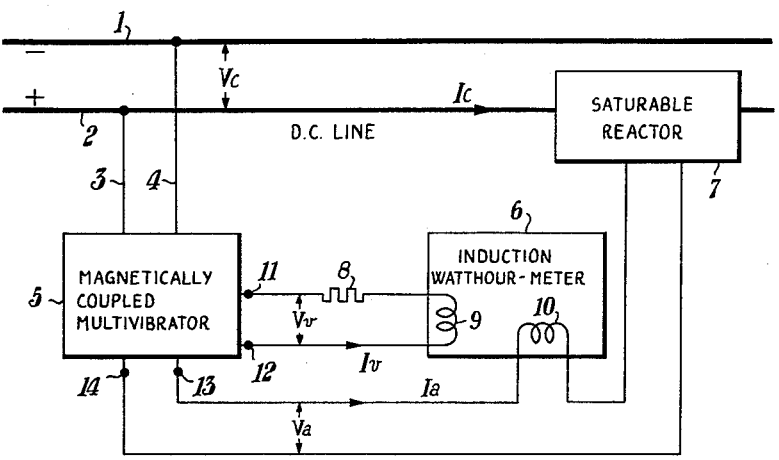
FIGURE 1 is a block diagram of principal components of the invention.

Referring to the FIGURE 1, the watt-hour metering device consists of a magnetically coupled multivibrator 5 which is fed by the D.C. line 1, 2 and gives as outputs square wave voltages whose amplitude is proportional to the D.C. input voltage. One output of the multivibrator supplies the current coil 9 of a single phase induction watt-hour meter 6 through a resistor 8, a second output supplies the voltage coil 10 of the same watt-hour meter through a saturable reactor 7 working as a D.C. transformer.

Figure 2:
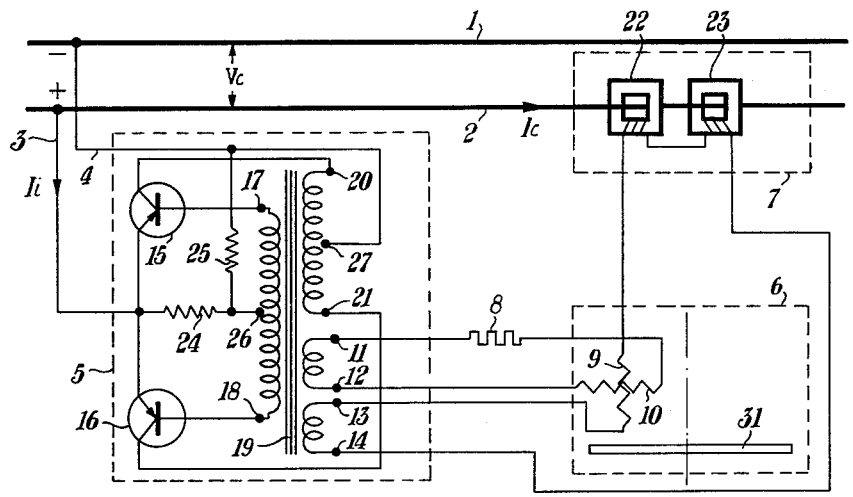
FIGURE 2 is an electric circuit showing one embodiment of the invention.

FIGURE 2 shows an embodiment of a magnetically coupled multivibrator employing two pnp transistors 15 and 16 as switches fed by the D.C. voltage $V_c$ and controlled by the electromotive forces induced by the flux variations in the core of the transformer 19. Resistors 24 and 25 are used for biasing bases of transistors 15 and 16. Additional circuits for limiting reverse voltages across each transistor and for starting oscillations are omitted in FIG. 2, but are described in the literature (see Shea: Transistor Circuit Engineering, John Wiley (1957), page 422 or R. A. Greiner: Semiconductor Devices and Applications, McGraw-Hill, 1961 edition, page 403).

If the number of turns of winding between terminals 26 and 17 (or 26 and 18) is great enough to maintain oscillations, and if voltage drops in the circuit feeding the transformer are negligible, the output voltage $V_a$ and $V_v$ between terminals 14–13 and 11–12 have frequency $f$ equal to $$f = \frac{V_c}{4N} BS \qquad (1)$$

and square wave shape with amplitude respectively equal to $$V_v = \frac{V_c}{N} N_v \qquad (2)$$

$$V_a = \frac{V_c}{N} N_a \qquad (3)$$

wherein:

N is the number of turns of winding between terminals 27–20 (or 27–21)
$N_v$ is the number of turns of winding between terminals 11–12
$N_a$ is the number of turns of winding between terminals 13–14
B is the saturation induction of the core of the transformer 19
S is the cross section of the core of the transformer 19.

From Equation 3 it results that the current $I_v$ flowing through the current coil 9 of the induction watt-hour meter 6 is proportional to the D.C. voltage $V_c$ and, if resistor 8 is great enough, both current $I_v$ and voltage $V_v$ will assume zero values practically at the same time (that means also that the fundamental harmonic of $I_v$ has a very small phase angle with respect to the fundamental harmonic of the output voltage $V_v$).

The current $I_a$ flowing through the voltage coil 10 of the induction watt-hour meter 6 is controlled by means of a saturable reactor 7 working as D.C. transformer. It is well known that a D.C. transformer consists of at least two cores (shown at 22 and 23 in FIG. 2) each having two separate control and output windings connected in series, the output windings being oppositely wound in order to compensate the odd harmonics of electromotive forces induced in each control winding by the A.C. current flowing through said output windings. Should the impedance of the control circuit transferred into the output circuit be very high (for instance by making equal to one the number of turns of the control winding as shown in FIG. 2) and should the voltage drop caused by current $I_a$ flowing into the output circuit be small in comparison with the supply voltage $V_a$, the current $I_a$ will have a square wave shape and will assume zero value at a time $t_1$ which is always less than $$\frac{1}{4f}$$

but very close to it (that means also that the phase angle of the fundamental harmonic of $I_a$ with respect to the fundamental harmonic of the voltage $V_a$ is very close to $-90°$). Should the D.C. current $I_c$ flowing into line 1, 2 increase, the shape of current $I_a$ will still remain very close to a square wave but its amplitude will vary proportionally and the time interval $t_1$ will decrease. The maximum value allowable for $I_c$ is determined just by the change of $t_1$ because it may cause the speed revolution of the disc 31 of the watt-hour meter not to vary proportionally to the D.C. power.

It would appear that the current $I_a$ flowing through the voltage coil 10 of the induction watt-hour meter 6 might be affected by variations of D.C. voltage $V_c$ because, as shown before, this voltage determines the amplitude and the frequency of the voltage $V_a$ supplying the circuit comprising the saturable reactor and said voltage coil. However, this generally does not occur since, as it is known, by an adequate design of the saturable reactor it is possible to obtain that, the output current—which in this case is $I_a$—depends only on the control current $I_c$ and is very little influenced by the amplitude or the frequency of the supply voltage—which in this case are $V_a$ and $f$. It is to be noted that for commercial D.C. transformers, if the control current assumes the maximum value and stays constant, ±10% supply voltage variation will cause less than ±1% variations of output current.

For more details about D.C. transformers, see Storm: Magnetic Amplifiers (Wiley, 1958), and two articles by the present inventor published in the Journal of Italian Association of Electrical Engineers: L'Ellettrotecnica. The first one (vol. 47, No. 9, pages 630–642) contains the theory and applications of D.C. transformers and the second one (vol. 47, No. 11, pages 755–764) is directed to D.C. transformers fed by A.C. sources having square wave shape.

From the above, it is evident that if the magnetically coupled multivibrator 5, the saturable reactor 7 and the resistor 8 are well designed the speed revolution of the disc 27 of the induction watt-hour meter used as indicating instrument is strictly proportional to D.C. power and the D.C. transformer does not add any remarkable error to proper error of said induction watt-hour meter.

For $I_c$ variable between 150% and 10% of its nominal value, the error of the energy measurement according to the present application may be comprised in the range between −2% and +2%; if $V_c$ varies between ±20% of its nominal value then there is an additional ±1% error; some prototypes designed for $V_c=200$ v. and $I_c=1000$ a. were carefully tested and confirmed the above mentioned accuracies.

Figure 3:
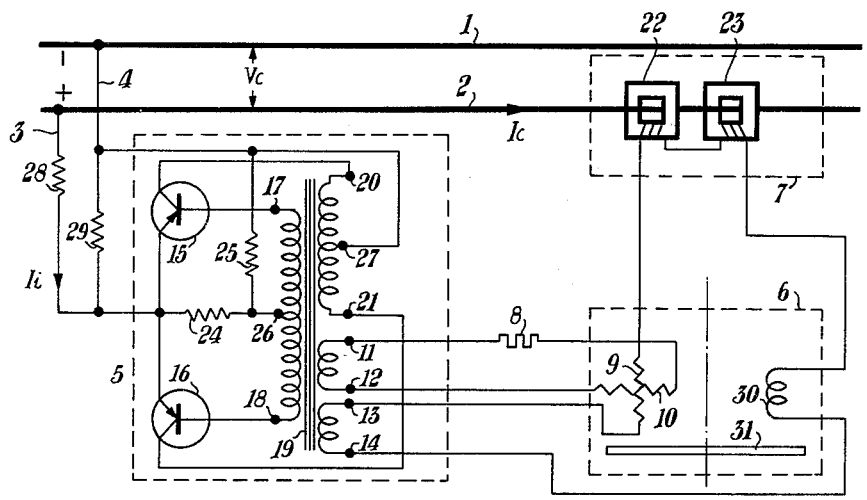
FIGURE 3 is a modification of the circuit shown in FIGURE 2 for the use in high voltage D.C. system (D.C. voltage higher than 500 v.).

If the D.C. voltage $V_c$ is too high for supplying directly the transistors 15 and 16 it is necessary to feed the multivibrator through a voltage divider 28 and 29 as shown in FIG. 3. In this case an auxiliary induction means 30 is added to the watt-hour meter 6 and acts on the same disc 31 as shown in FIG. 3 or on a separate disc rigidly connected to the first one. The auxiliary induction means is provided for generating an additional torque proportional to $I_a^2$ and for this reason it is fed by the current controlled by the D.C. transformer as shown in FIG. 3. For the sake of simplicity this auxiliary induction means comprises a single coil 30 disposed on a core which produces an asymmetric flux (for instance by means of a shading coil and an asymmetric gap). Currents induced into the disc 31 by this flux react with the same flux and produce an additional motive torque proportional to $I_a^2$.

In the case of the circuit shown in FIG. 3 the current $I_1$ flowing through the resistor 28 increases proportionally to the power dissipated in the circuit fed by voltage $V_a$. As a consequence the voltage $V_v$, the current $I_v$, and the motive torque produced by the main induction motor decrease proportionally to $I_a^2$. The addition of the auxiliary induction means is needed for maintaining the speed revolution of the disc 31 proportional to D.C. power.

A watt-hour meter for a D.C. network fed by 3 kv. was built in accordance with the diagram shown in FIG. 3 and tested for a long time with D.C. current $I_c$ up to 1000 a. The results were very satisfactory and the equipment was designed for measuring D.C. energy on railway locomotives.

As the inventor has demonstrated in the article "Il funzionamento in regime transitorio dei trasformatori di misura per corrente continua" (published in the review L'Elettrotecnica, vol. 50 (1963), No. 8), if a saturable reactor works as a D.C. transformer, output curent transients generated by a sudden variation of the control current do not exceed two periods of supply voltage. As a consequence, the response time of the measuring devices shown in FIGS. 2 and 3 is very low and is affected neither by the D.C. transformer nor by the multivibrator as in devices of this kind hitherto known, but depends only on the induction watt-hour meter.

I claim:

1. A D.C. watt-hour metering device for D.C. networks fed by a D.C. line consisting of a negative wire and a positive wire, comprising a saturable reactor having two cores each with one output winding, said saturable cores surrounding one of the D.C. wires acting as control windings, said two output windings being connected in series to one another and oppositely wound to cause said reactor to work as a D.C. transformer, a single phase induction watt-hour meter having a current coil, a voltage coil and a rotary disc, a compensating resistor connected in series with the current coil of said watt-hour meter, an auxiliary induction means having a main coil and a shading coil and acting on said disc of said watt-hour meter, said main coil being connected in series with the output windings of said saturable reactor and said voltage coil of said single phase induction watt-hour meter, a magnetically-coupled mutivibrator generating square wave voltage with amplitude proportional to the voltage of the D.C. line, said magnetically coupled multivibrator including two transistors, a resistive voltage divider connected across the D.C. line and biasing bases of said transistors and a transformer having a primary winding, a first, a second and a third secondary winding, said two transistors having emitters connected to one another and to the positive wire of the D.C. line, said primary winding having terminals connected with bases of said transistors and a central tap connected with an intermediate point of said resistive voltage divider, said first secondary winding having terminals connected with collectors of said transistors and a central tap connected to the negative wire of the D.C. line, said second secondary winding supplying in series the output winding of said saturable reactor and the voltage coil of said watt-hour meter and auxiliary induction means, said third secondary winding supplying in series the current coil of said watt-hour meter and said compensating resistor.

2. A D.C. watt-hour metering device for D.C. networks fed by a D.C. line consisting of a negative wire and a positive wire, comprising a saturable reactor having two cores each with one output winding, said saturable cores surrounding one of the D.C. wires acting as control windings, said two output windings being connected in series to one another and oppositely wound to cause said reactor to work as a D.C. transformer, a single phase induction watt-hour meter having a current coil, a voltage coil and a rotary disc, a compensating resistor connected in series with the voltage coil of said watt-hour meter, an auxiliary induction means having a main coil and a shading coil and acting on said disc of said watt-hour meter, said main coil being connected in series with the output windings of said saturable reactor and said current coil of said single phase induction watt-hour meter, a magnetically-coupled multivibrator generating square wave voltage with amplitude proportional to the voltage of the D.C. line, said magnetically coupled multivibrator including two transistors, a resistive voltage divider connected across the D.C. line and biasing bases of said transistors and a transformer having a primary winding, a first, a second and a third secondary winding, said two transistors having emitters connected to one another and to the positive wire of the D.C. line, said primary winding having terminals connected with bases of said transistors and a central tap connected with an intermediate point of said resistive voltage divider, said first secondary winding having terminals connected with collectors of said transistors and a central tap connected to the negative wire of the D.C. line, said second secondary winding supplying in series the output winding of said saturable reactor and the current coil of said watt-hour meter and auxiliary induction means, said third secondary winding supplying in series the voltage coil of said watt-hour meter and said compensating resistor.

3. A D.C. watt-hour metering device for D.C. networks fed by a D.C. line consisting of a negative wire and a positive wire, comprising a saturable reactor having two cores each with one output winding, said saturable cores surrounding one of the D.C. wires acting as control windings, said two output windings being connected in series to one another and oppositely wound to cause said reactor to work as a D.C. transformer, a single phase induction watt-hour meter having a current coil, a voltage coil and a rotary disc, a compensating resistor connected in series with the current coil of said watt-hour meter, an auxiliary induction means having a main coil and a shading coil and acting on the disc of said watt-hour meter, said main coil being connected in series with the output windings of said saturable reactor and the voltage coil of said single phase induction watt-hour meter, a magnetically-coupled multivibrator generating square wave voltage with amplitude proportional to the voltage of the D.C. line, said magnetically-coupled multivibrator including two transistors, a first resistive voltage divider connected across the D.C. line, a second resistive voltage divider connected to the negative wire of the D.C. line and to an intermediate point of said first voltage divider and biasing bases of said transistors, and a transformer having a primary winding, a first, a second and a third secondary winding, said two transistors having emitters connected to one another and to said intermediate point of said first voltage divider, said primary winding having terminals connected with bases of said transistors and a central tap connected with an intermediate point of said second resistive voltage divider, said first secondary winding having terminals connected with collectors of said transistors and a central tap connected to the negative wire of the D.C. line, said second secondary winding supplying in series the output windings of said saturable reactor and the voltage coil of said watt-hour meter and auxiliary induction means, said third secondary winding supplying in series the current coil of said watt-hour meter and said compensating resistor.

4. A D.C. watt-hour metering device for D.C. networks fed by a D.C. line consisting of a negative wire and a positive wire, comprising a saturable reactor having two cores each with one output winding, said saturable cores surrounding one of the D.C. wires acting as control windings, said two output windings being connected in series to one another and oppositely wound to cause said reactor to work as a D.C. transformer, a single phase induction watt-hour meter having a current coil, a voltage coil and a rotary disc, a compensating resistor connected in series with the voltage coil of said watt-hour meter, an auxiliary induction means having a main coil and a shading coil and acting on the disc of said watt-hour meter, said main coil being connected in series with the output windings of said saturable reactor and the current coil of said single phase induction watt-hour meter, a magnetically-coupled multivibrator generating square wave voltage with amplitude proportional to the voltage of the D.C. line, said magnetically coupled multivibrator including two transistors, a first resistive voltage divider connected across the D.C. line, a second resistive voltage divider connected to the negative wire of the D.C. line and to an intermediate point of said first voltage divider and biasing bases of said transistors, and a transformer having a primary winding, a first, a second and a third secondary winding, said two transistors having emitters connected to one another and to said intermediate point of said first voltage divider, said primary winding having terminals connected with bases of sad transistors and a central tap connected with an intermediate point of said second resistive voltage divider, said first secondary winding having terminals connected with collectors of said transistors and a central tap connected to the negative wire of the D.C. line, said second secondary winding supplying in series the output windings of said saturable reactor and the current coil of said watt-hour meter and auxiliary induction means, said third secondary winding supplying in the series the voltage coil of said watt-hour meter and said compensating resistor.

References Cited by the Examiner

UNITED STATES PATENTS

| 2,502,848 | 4/50 | Hughes | 324—120 |
| 2,886,764 | 5/59 | Zelina | 324—142 X |

WALTER L. CARLSON, *Primary Examiner.*